US009424692B2

(12) United States Patent
Wiedner

(10) Patent No.: US 9,424,692 B2
(45) Date of Patent: Aug. 23, 2016

(54) SYSTEMS AND METHODS FOR TRANSIT INDUSTRY VEHICLE HARDWARE-AGNOSTIC COMMUNICATION

(71) Applicant: Trapeze Software Inc., Mississauga (CA)

(72) Inventor: David Wiedner, Cedar Rapids, IA (US)

(73) Assignee: TRAPEZE SOFTWARE ULC, Mississauga (CA)

( * ) Notice: Subject to any disclaimer, the term of this patent is extended or adjusted under 35 U.S.C. 154(b) by 6 days.

(21) Appl. No.: 13/728,125

(22) Filed: Dec. 27, 2012

(65) Prior Publication Data

US 2014/0188305 A1 Jul. 3, 2014

(51) Int. Cl.
*G06F 17/00* (2006.01)
*G07C 5/00* (2006.01)

(52) U.S. Cl.
CPC .................................... *G07C 5/008* (2013.01)

(58) Field of Classification Search
CPC ........................ G06F 3/04847; H04L 67/2828
See application file for complete search history.

(56) References Cited

U.S. PATENT DOCUMENTS

2007/0033538 A1* 2/2007 Mann et al. .................. 715/764
2007/0061487 A1* 3/2007 Moore et al. ................. 709/246
2009/0173839 A1* 7/2009 Groeneweg et al. ........... 246/15

* cited by examiner

*Primary Examiner* — John R Olszweski
*Assistant Examiner* — Jason Roberson
(74) *Attorney, Agent, or Firm* — Elan IP INC.

(57) ABSTRACT

Systems and methods for hardware-agnostic communication between one or more mobile data terminals and one or more vehicle logic units, where a vehicle logic unit can communicate with one or more inputs from a transit industry vehicle and create an abstraction interface capable of being processed by multiple mobile data terminal hardware platforms—meaning that each vehicle logic unit can communicate with multiple mobile data terminals, and each mobile data terminal can communicate with multiple vehicle logic units.

6 Claims, 5 Drawing Sheets

SYSTEMS AND METHODS FOR TRANSIT INDUSTRY VEHICLE HARDWARE-AGNOSTIC COMMUNICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Transit industry vehicles (TIV) typically have many systems running thereon, such as engines, breaks, audio announcement technology, signage, and the like. Many TIVs have monitors that keep track of, and set, the status of such systems. A familiar technology solution is to have various inputs and outputs from the systems provided to a vehicle logic unit (VLU), such VLU remains on the vehicle in normal operation. Operators of the TIV often then interact with the VLU (and its data) via a mobile data terminal (MDT).

MDTs are continuously evolving and are varied, across hardware manufacturers and the transit agencies that purchase and deploy those MDTs in their fleets. As with other, general purpose, computing devices, the trend is for MDTs to become smaller, more powerful and flexible, and to communicate in many different ways.

VLUs, although typically less dynamic than MDTs, are also continuously evolving and frequently interact with newer systems, more systems, and different inputs/outputs for those systems.

While VLUs typically reside and remain on vehicles until they are replaced, it may be desirable for MDTs to be removed from the TIV, for example by the operator, and employed on another TIV at a later time. Each VLU may thus interact with multiple MDTs, and the reverse.

Unfortunately, the applications running on these varied and evolving MDTs and VLUs have historically needed to be continuously changed—both to operate on the devices, to communicate with each other, and to communicate with the systems on a TIV. This is undesirable, time-consuming, and expensive.

There thus remains a need for hardware-agnostic mobile data terminal communication.

SUMMARY OF THE INVENTION

There is a method for hardware-agnostic communication between one or more mobile data terminals (MDT) used for monitoring and controlling one or more TIV inputs or outputs (TIVIO) of transit industry vehicles, and one or more vehicle logic units (VLU) located on transit industry vehicles (TIV), that are capable of communicating with one or more TIVIO, comprising requesting, by an MDT application executed by a processor on a first MDT, communication with a first VLU on a first TIV, accepting, by a VLU application executed by a processor on the first VLU, the request to communicate from the first MDT, providing, by the VLU application executed by a processor on the first VLU, a first abstraction interface to the first MDT, processing, by the MDT application executed by a processor on the first MDT, the provided abstraction interface, and monitoring, by the MDT application executed by a processor on the first MDT, the first TIV.

The abstraction interface may comprise an XML file having one or more components, each component representative of one of one or more TIVIO of the first TIV and the processing may further comprise receiving the XML file, determining the first VLU's components, and adjusting an application on the first MDT, responsive to the results of determining.

The adjusting may further comprise adding, to a monitoring screen of the application, a user interface element for each one or more TIVIO that can be monitored by the first MDT, inserting, on a controlling screen of the application, a user interface element for each one or more TIVIO that can be controlled by the first MDT.

The accepting may further comprise granting an access level to the first MDT and the one or more components that can be monitored and the one or more components that can be controlled are based on the access level granted.

The providing may further comprise polling the TIV for TIVIO on the TIV, inserting a component into the XML file for each TIVIO on the TIV, and obtaining one or more TIVIO values for each component having at least one value.

The method may further comprise selecting a first MDT from one or more MDT hardware platforms, such hardware platforms comprising Blackberry™, Android™ or iPhone™ smartphones and Windows™ and iOS™ computing devices.

There is further provided a method for hardware-agnostic communication between one or more mobile data terminals (MDT) used for monitoring and controlling one or more TIV inputs or outputs (TIVIO) of transit industry vehicles, and one or more vehicle logic units (VLU) located on transit industry vehicles (TIV), that are capable of communicating with one or more TIVIO, comprising requesting, by an MDT application executed by a processor on an MDT, communication with a VLU on a TIV, accepting, by a VLU application executed by a processor on the VLU, the request to communicate from the MDT, providing, by the VLU application executed by a processor on the VLU, an abstraction interface to the MDT, processing, by the MDT application executed by a processor on the MDT, the provided abstraction interface, and monitoring, by the MDT application executed by a processor on the MDT, the TIV.

The requesting, processing and monitoring may be done by a first MDT and the accepting and providing may be done by a first VLU.

The requesting, processing and monitoring may be done concurrently by a first MDT and a second MDT communicating with a first VLU, and the accepting and providing may be done by the first VLU.

The requesting, processing and monitoring may be done by a first MDT communicating with a first VLU and a second VLU, and the accepting and providing may both be done by both the first VLU and the second VLU.

There is further a system for hardware-agnostic communication between one or more mobile data terminals (MDT) used for monitoring and controlling one or more TIV inputs or outputs (TIVIO) of transit industry vehicles (TIV), and one or more vehicle logic units (VLU) located on TIVs, that are capable of communicating with one or more TIVIO, comprising a vehicle logic unit (VLU), further comprising one or more TIVIO jacks connected to one or more TIVIO, a VLU application, configured to poll the TIV for its one or more TIVIO and TIVIO values for each polled TIVIO and create an abstraction interface for communicating the TIVIO and TIVIO values to one or more MDTs upon receiving a communication request.

The system may further comprise one or more MDTs, further comprising an MDT application, configured to request communication with one or more VLUs, receive one or more abstraction interfaces from the one or more VLUs, processing the one or more abstraction interfaces, and monitoring the one or more TIVs. The abstraction interface may comprise an XML file having one or more components, each component representative of one of one or more TIVIO of the first TIV. The processing the one or more abstraction interfaces further comprises receiving the XML file, determining the first VLU's components, and adjusting the MDT application, responsive to the results of determining.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
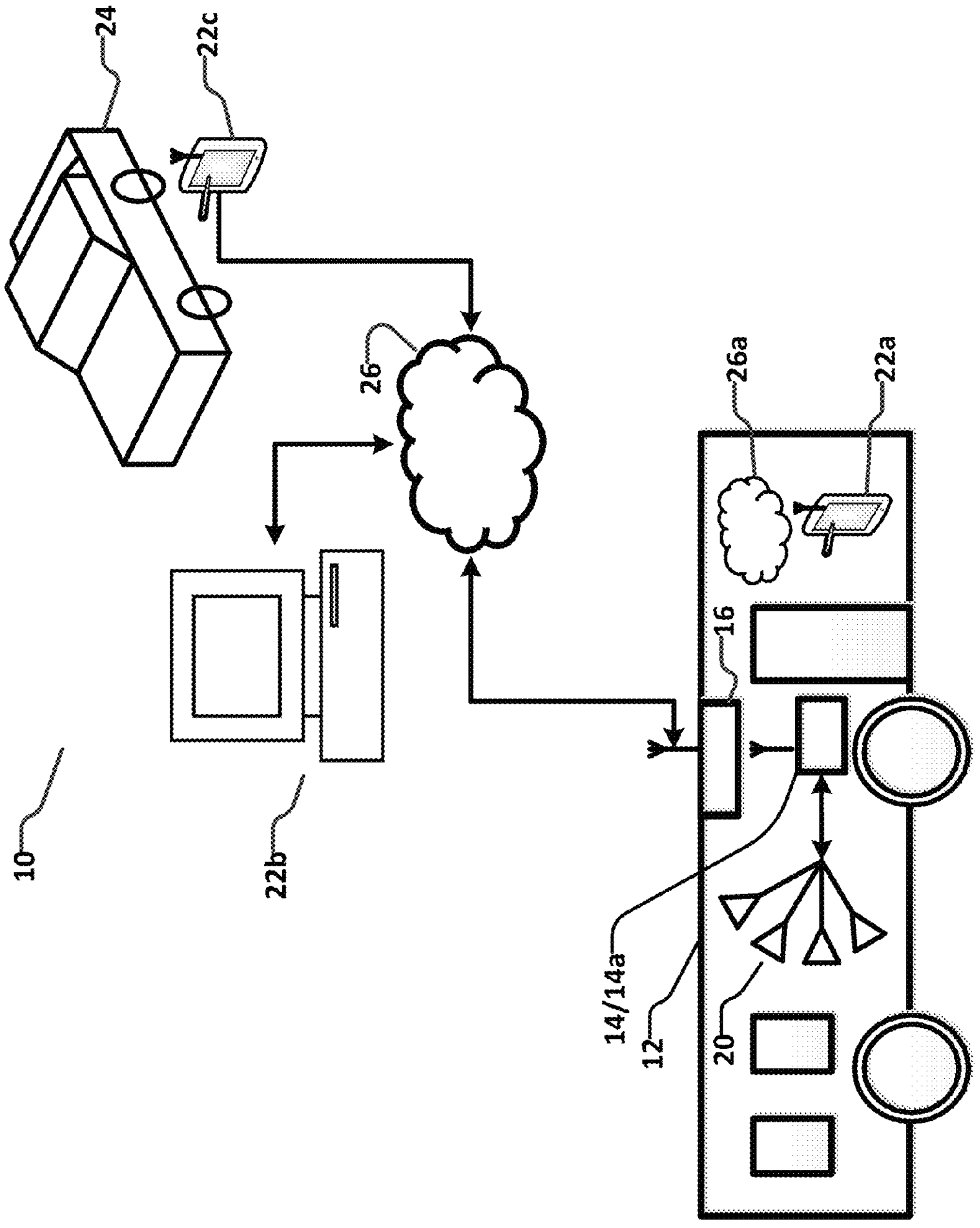
FIG. 1 is a diagram of a system for transit industry vehicle hardware-agnostic communication according to a non-limiting embodiment of the present invention.

FIG. 1 is a diagram of a system for transit industry vehicle hardware-agnostic communication comprising TIV 12, further comprising router 16, VLU 14 with one or more TIV inputs/outputs (TIV IO) 20, and MDT 22*a*, communication network 26, vehicle area network 26*a*, MDT 22*b*, vehicle 24 further comprising MDT 22*c*.

TIV 12 is a vehicle that provides, or relates to the provision of, transit services. TIV 12 may include buses, para-transit vehicles, maintenance vehicles, supervisory vehicles (such as cars or vans driven by supervisors) or a light rail/TRAM vehicles. TIV 12 has many systems running thereon, as known in the art, such as engines, brakes, audio announcement technology, signage, passenger counting, and the like (each a "TIV System", not shown).

Vehicle 24 includes TIVs 12 but also includes vehicles operated by anyone that may have an MDT 22. Exemplary vehicles may include police, emergency, and vehicles driven by operators (such as prior to or after a run, route or service.

Control center 22*b* may be at a transit agency, and may have further systems that form part of the overall system enabling one or more forms of transportation for a transit agency. Control center 22*b* may be considered an MDT 22, despite possibly having greater systems as well.

Vehicle 24 and control center 22*b* may have MDTs 22 that are not physically connected to TIV 12. As such MDTs 22 are able to communicate wirelessly, as is WVLU 14*a*, they may still perform control and monitoring functions for TIV 12.

MDT 22 is a computing device that may take user input (such as keystrokes, clicks, touch inputs, and the like) and provides the user interface to functionality relating to the provision of transit services. MDT 22 may often be located on TIV 12, but may be removable therefrom. Exemplary MDTs 22 include mobile phones, tablets, laptops (that may be running Windows™ or iOS™ operating systems, for example), ruggedized laptops, vendor specific MDTs (such as Android™. Blackberry™ or Apple™ products). Each of these combinations of vendor and product type (laptop versus smartphone for example) may be considered a hardware platform for MDT 22 and each of these hardware platforms may be able to communicate and function with any VLU 14 using the abstraction interface. Operators of TIV 12, or supervisors, may be some of the primary users of MDTs 22.

VLU 14 is an embedded computing device in TIV 12 that communicates with VAN 26*a*, one or more TIV IO 20, and MDT 22. Communication by VLU 14 may be via wireless or wired communication (such as via a serial port and/or VGA connection), but has typically been wired between VLU 14 and MDT 22. An exemplary VLU is Trapeze's IVLU™.

Wireless Vehicle Logic Unit 14*a* (WVLU) is a type of VLU 14. WVLU 14*a* is a computing device that communicates with one or more TIV I/O 20, router 16 (which may be a VAN 26*a*, or part of a VAN 26*a*) and further communicates with one or more MDTs 22 (optionally via VAN 26*a*). As such WVLU 14 may be referred to interchangeably herein as mobile platform 14*a*. Communication between WVLU 14 and TIV I/O 20 may be to read values from systems, or set values in systems. As described herein, exemplary communication may include reading a longitude and latitude from a GPS receiver, or to enable a passenger counting system to start counting passenger entries and exits. As described herein, exemplary communication between WVLU 14 and MDT 22 may include requesting information (by MDT 22 of one or more TIV I/O 24) or setting parameters or values in systems or WVLU 14 itself. TIV I/O 20 may be plugged into "jacks" (not shown) on VLU 14. Each jack may be implemented using different hardware to accommodate different TIV I/O 20, as would be known to those of skill in the art.

Communication between WVLU 14 and TIV I/O 20, and between WVLU and MDT 22, may be wired (such as Ethernet, RS232 and the like) or wireless (such as infrared, Bluetooth™, WLAN, cellular, and the like) and may be via VAN 26*a* and/or router 16. WVLU 14 communication may be accomplished via an abstraction interface, such as a REST interface, as described herein.

TIV IO 20 may be any inputs and/or outputs that communicate with, or form part of, any systems that are part of, or incorporated with, TIV 12. TIV IO 20 are able to communicate with other systems and/or computing devices, such as via wired or wireless communication paths or communication networks. TIV IO 20 may be wired into a VLU 14 or may communicate wirelessly to one or more VLU 14*a* (WVLU 14*a*). Exemplary TIV IO 20 may include an odometer, GPS, modem (for TDMA or CDMA communications), engine controllers, automated passenger counters (APC), American Disability Act (ADA) signs and head signs, fare collection systems, traffic signal priority (TSP) systems, audio and video systems, or discrete inputs (that may or may not be part of one or more of the above TIV IO).

Discrete inputs may require an "on" or "off" signal, such as limit switches, selector switches or relay contacts. TIV IO 20 may have values (numeric, discrete, etc) that may be polled by VLU 14 and may be set by VLU 14 (such as via MDT 22).

Communication network 26 may be substantially any public or private network, wired or wireless, and may be substantially comprised of one or more networks that may be able to facilitate communication between themselves. VAN 26*a* may be a form of communication network that exists on a vehicle. Other than being geographically restricted (as it may extend only a certain distance from where a vehicle may be at a particular time), VAN 26*a* may be substantially similar to communication network 26. Router 16 may form part of VAN 26*a* and may allow WVLU 14*a* to communicate with it, so that communication can then continue. For example, router 16 may be a 4G router such that WVLU 14*a* may then communicate as widely as any cellular device, including to control center 22*b* or vehicle 24.

Figure 2:
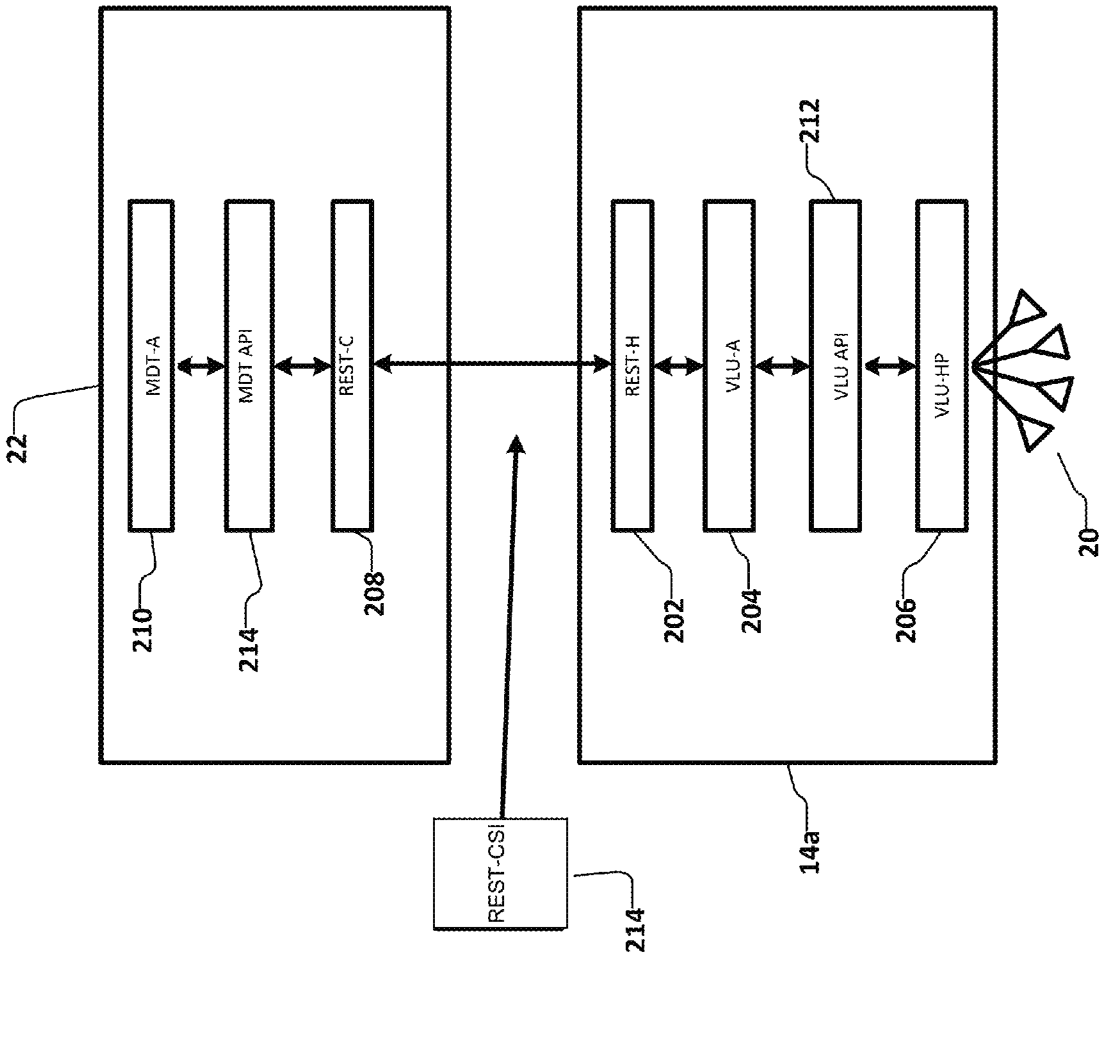
FIG. 2 is a further diagram of a system for transit industry vehicle hardware-agnostic communication according to a non-limiting embodiment of the present invention.

FIG. 2 is a further diagram of a system for transit industry vehicle hardware-agnostic communication comprising MDT 22 further comprising REST interface client (REST-C) 208, MDT API 214, and MDT application (MDT-A) 210, WVLU 14*a* (which may be VLU 14) further comprising REST interface host (REST-H) 202, VLU application (VLU-A) 204, VLU API 212, and VLU hardware platform (VLU-HP) 206.

The term REST refers to REpresentational State Transfer, a type of software architecture for distributed systems, as known by those of skill in the art. REST allows remote procedure calls (RPC) via a web service interface from a WLAN, LAN or local connection between a client end point (such as MDT 22 in embodiments of the present invention) and a host mobile platform (such as VLU 14 or WVLU 14*a* in embodiments of the present invention).

The REST interface, as contemplated in aspects of the present invention, comprises three parts, REST-H 202, which resides on VLU 14 and REST-C 208, which resides on one or more MDT 22, and REST client server interface (or abstraction client server interface or abstraction interface) (REST CSI) 214. REST-H 202 may act as a web server, allowing one or more REST-C connections to communicate with VLU 14, such as via TCP/IP. REST-C 208 interacts with REST-H to communicate information between MDT 22 and VLU 14. With REST-H 202 on VLU 14 or WVLU 14*a*, any MDT (with any underlying hardware, software or operating system) can communicate with WVLU 14*a*—providing REST-C 208 is present. As such (and because WVLU 14*a* can accommodate multiple sessions), multiple MDTs 22 (such as 22*a*, 22*b*, and 22*c*) can all communicate with a particular WVLU 14*a*.

REST CSI 214 facilitates and provides formatting and structure for communications within system 10. REST CSI 214 may be one or more files, data streams, or communications exchanged at various times or intervals between REST-C and REST-H. REST CSI 214 may be used to provide a standardized "data stream" to provide communications (for example asynchronous communication) between MDT 22 and VLU 14. The file may be created and the entries may be populated with current status and/or command information. Typically VLU 14 may create the file once and then update the data entries on a predetermined duty cycle, for example twice per second, and broadcast this at that same rate. This broadcast may allow one or more MDTs 22, that are interested, to receive REST IM 214 and use its contents to perform various functions. When MDT 22 issues a command to VLU 14, it may create an XML file for that transaction/command, for example to display text data to an ADA sign inside TIV 12.

REST CSI 214 may be implemented, for example, via one or more XML interfaces/files. An exemplary REST CSI 214 is shown below:

```
<?xml version="1.0"?>
<MTConnectStreams xsi:schemaLocation="urn:domainconnect.com:MTConnectStreams:1.1
<http://www.mtconnect.org/schemas/MTConnectStreams 1.1.xsd"
<xmlns:xsi="http://www.w3.org/2001/XMLSchema-instance"
<xmlns="urn:mtconnect.com:MTConnectStreams:1.1">
<Header lastSequence="223" firstSequence="16" nextSequence="224" version="1.0.12039"
bufferSize="10000" instanceId="634744242975340000" sender="VI IVLU
" creationTime="20xx-xx-xx T16:32:47"/>
<<Streams>
<<DeviceStream name="IODevice" id="IODevice" uuid="IODevice"><ComponentStream
<name="Discretes" componentId="Discretes"component="Component">
<<Events>
<Discrete name="DiscIn0" timestamp="20xx-xx-xx T10:32:03" sequence="52"
dataItemId="IODevice.Discretes.DiscIn0">True</Discrete>
<Discrete name="DiscIn1" timestamp="20xx-xx-xx T10:32:03" sequence="53"
dataItemId="IODevice.Discretes.DiscIn1">True</Discrete>
<Discrete name="DiscIn2" timestamp="2012-06-04T10:32:03" sequence="54"
dataItemId="IODevice.Discretes.DiscIn2">True</Discrete>
</Events>
</ComponentStream>
<<ComponentStream name="Analogs" componentId="Analogs" component="Component">
<<Events>
<Analog name="Odom" timestamp="20xx-xx-xx T10:32:47" sequence="223"
dataItemId="IODevice.Analogs.Odom">2614</Analog>
<Analog name="MiscWarm" timestamp="20xx-xx-xx T10:32:03" sequence="59"
dataItemId="IODevice.Analogs.MiscWarm">8</Analog>
</Events>
</ComponentStream>
<<ComponentStream name="Location" componentId="Location" component="Component">
<<Events>
<Location name="Latitude" timestamp="20xx-xx-xxT10:32:46" sequence="217"
dataItemId="IODevice.Location.Latitude">42.032991</Location>
<Location name="Longitude" timestamp="20xx-xx-xx T10:32:46" sequence="218"
dataItemId="IODevice.Location.Longitude">–91.6503273</Location>
```

-continued

<Location name="Speed" timestamp="20xx-xx-xx T10:32:46" sequence="220" dataItemId="IODevice.Location.Speed">0.01</Location>
</Events>
</ComponentStream>
</DeviceStream>
</Streams>
</MTConnectStreams>

In reference to the above XML file (REST CSI 214) TIV IO 20 may be abstracted into "adapters", labeled "components" above. Details about TIV IO 20, and other aspects of VLU 14 or TIV 12 may also be inserted in REST CSI 214. MDT-A 210 may then probe VLU 14 for its REST IM 214, allowing it to find out how and of what type of adapters are installed on a VLU, and other features of VLU 14 and TIV 12, as described herein. Following this approach, any particular VLU 14 can communicate with one or more MDT-A 210 by providing REST CSI 214 thereto. Similarly, any particular MDT 22 can communicate with any VLU 14 having REST CSI 214 by probing for REST CSI 214 and interpreting the TIV IO 20 and other features of VLU 14.

The "ComponentStream" presents a standard interface for a component or TIVIO 20, regardless of the make and manufacturer of any of TIV I/O 20, MDT 22 and VLU 14. This allows many applications (including multiple MDT-A 210 and VLU-A 204) to share the standardized data provided by the DeviceStream. The DeviceStream may be dynamic in nature, only assembling and/or presenting/communicating to a particular MDT 22, the data items available on a particular VLU 14 or TIV 12 (or that are available based on the access level granted to the particular MDT 22).

VLU-A 204 is an application residing on VLU 14. VLU-A 204 largely controls VLU 14, including its operation and communication with other aspects of system 10. VLU-A 204 may have application programming interfaces (API), VLU API 212, associated therewith, or exposed, that provide access to functionality.

MDT-A 210 is an application residing on MDT 22. MDT-A 210 largely controls MDT 22, including its operation and communication with other aspects of system 10. MDT-A 210 may have application programming interfaces (API), MDT API 214, associated therewith, or exposed, that provide access to functionality. MDT-A 210 may be configured to present one or more screens to a user of MDT 22 to enable to functionality described herein. For example, MDT-A may process an XML file to determine what components (from TIV 12) should be displayed on one or more screens showing all TIV IO 20 (such as monitoring screens to monitor TIV IO 20 or controlling screens to control one or more TIV IO 20).

VLU-HP 206 is a hardware system that communicates with TIV IO 20. VLU-HP 206 may poll TIV IO 20, "listen" for communications thereto or therefrom, and the like, as described herein. Such may allow for determining what TIV I/O 20 may be present, and may involve polling or pinging one or more jacks of VLU 14. Communication may be wired or wireless. Communication may allow TIV IO 20 to be controlled, monitored, and the like, such as by reading values associated with TIV IO 20, receiving statistics or system information therefrom, or setting values or otherwise controlling TIV IO 20.

If MDT 22 is to communicate with VLU 14, MDT-A 210 may make a function call to VLU-A 204 via the MDT-A and MDT API. The function call and parameters are then serialized by REST-C 208 and transmitted to REST-H 202, un-serialized by REST-H 202 and then VLU-A determines which API call to make to the corresponding software component, hardware or TIV IO 20 connected to the VLU-HP 206.

Once VLU 14 API returns to the VLU-A the desired information (such as a status and any associated parameters), this information is serialized and returned to MDT 22, via the REST interface, to the associated REST-C 208. This REST-C 208 then un-serializes this returned information and it is returned to the MDT-A 210 via MDT API.

If VLU 14 is to communicate with MDT 22, a similar process would occur, but in reverse. VLU-A 204 may make a function call via the VLU-A 204 and VLU API 212. The function call and parameters may then be serialized by REST-H 202 and transmitted to REST-C 208, un-serialized by REST-C 208 and then MDT-A 210 determines which API call to make or other step to perform on MDT 22 to realize the desired functionality.

It is to be understood that communication between MDT 22 and VLU 14 may occur for many reasons, and at various frequencies. MDT-A 210 and VLU-A 204 may have particular functionalities, or users thereof may desire functionalities, that require communication to occur, potentially on a periodic basis (ie check the engine temperature every 30 seconds). There may be triggers for one-time communications, such as speed warnings, probing for current number of passengers, and the like.

Figure 3:
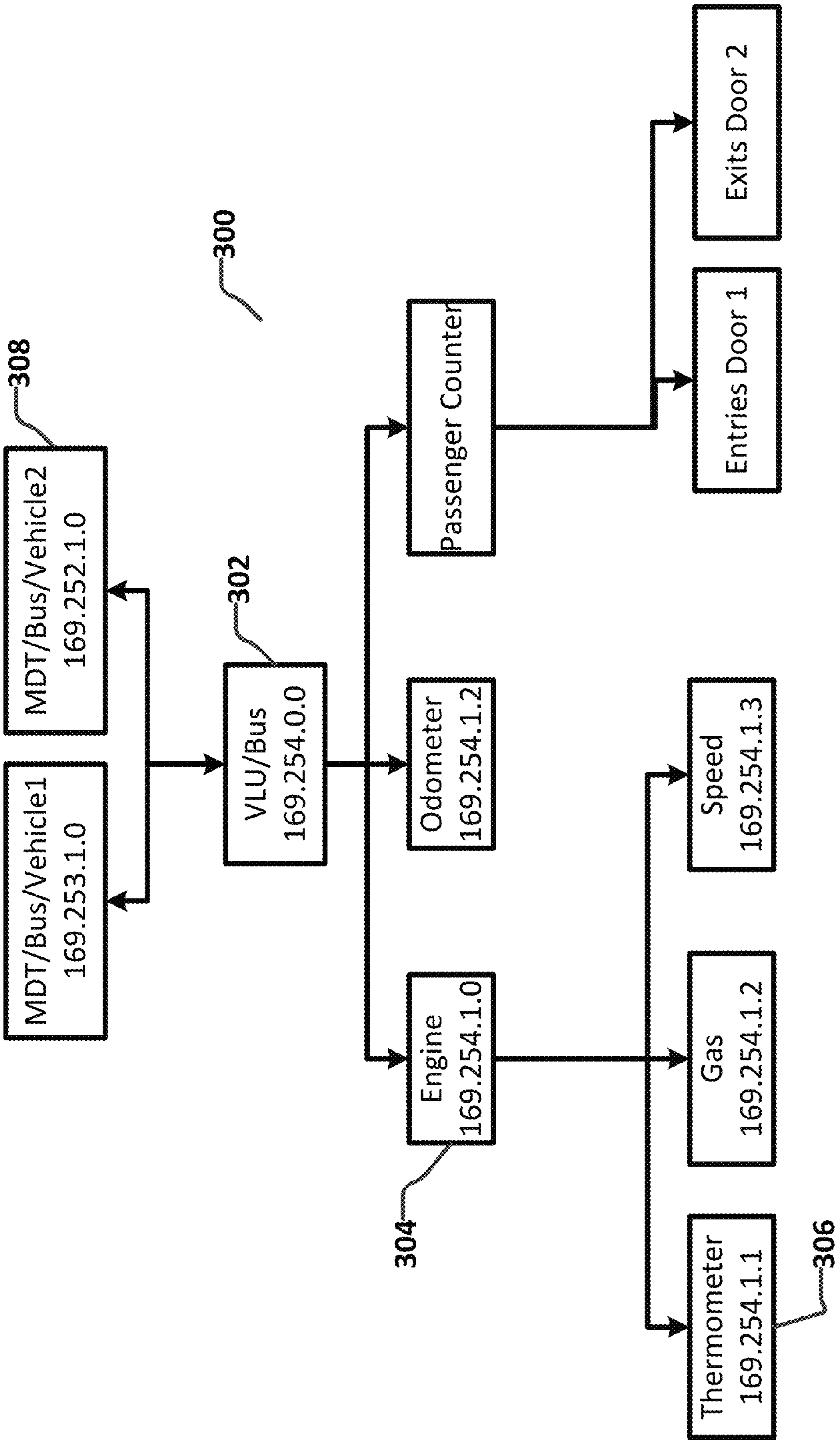
FIG. 3 is a further diagram of a system for transit industry vehicle hardware-agnostic communication according to a non-limiting embodiment of the present invention.

FIG. 3 is a further diagram of a system for transit industry vehicle hardware-agnostic communication comprising addressing scheme 300, further comprising first-level objects (FLO) 302/308, second level object (SLO) 304 and third-level object (TLO) 306.

These addresses may be a private or public address and may be part of, and known to the Internet at large, or a smaller network (such as VAN 26*a*, a private wide area network, or the like).

FLO 302 may be an address for VLU 14. As shown in FIG. 3, that may be 169.254.1.0. The "169" may represent an agency, the "254" VLU 14 or a bus. Similarly FLO 308 may be an address for MDT 22. As shown in FIG. 3, that may be 169.252.0.0. The "252" may represent MDT 22.

SLO 304 may be an address for a subsystem of a bus, such as an engine, odometer, or passenger counter system. As shown in FIG. 3, that may be 169.254.1.1. The "1" may represent the engine, and the "0" representing that it is the engine itself, as opposed to a subsystem.

TLO 306 may be an address for an aspect (characteristic, sensor, etc) of a subsystem, or a further subsystem, or a subsystem. As shown in FIG. 3, that may be 169.254.1.1. The "1" may represent the temperature of the engine.

Any of SLO 304, TLO 306 or even FLO 302 may be a TIV IO 20.

In many cases, VLU 14 may be hardwired to the subsystems in FIG. 3. In such case IP addresses may not be required.

Although many addressing schemes are within the scope of the present invention, that shown in FIG. 3 may allow VLU 14 to uniquely address all subsystems (and their components), both for its internal control and monitoring, and for that of any MDTs 22 that desire to communicate with VLU 14 and it subsystems. Similarly, addresses of MDTs 22 may allow one or more VLU 14 to communicate with MDTs 22. Addressing schemes may also indicate other characteristics about TIV IO 20, such as whether TIV IO 20 can be controlled or simply read, for example.

Figure 4:
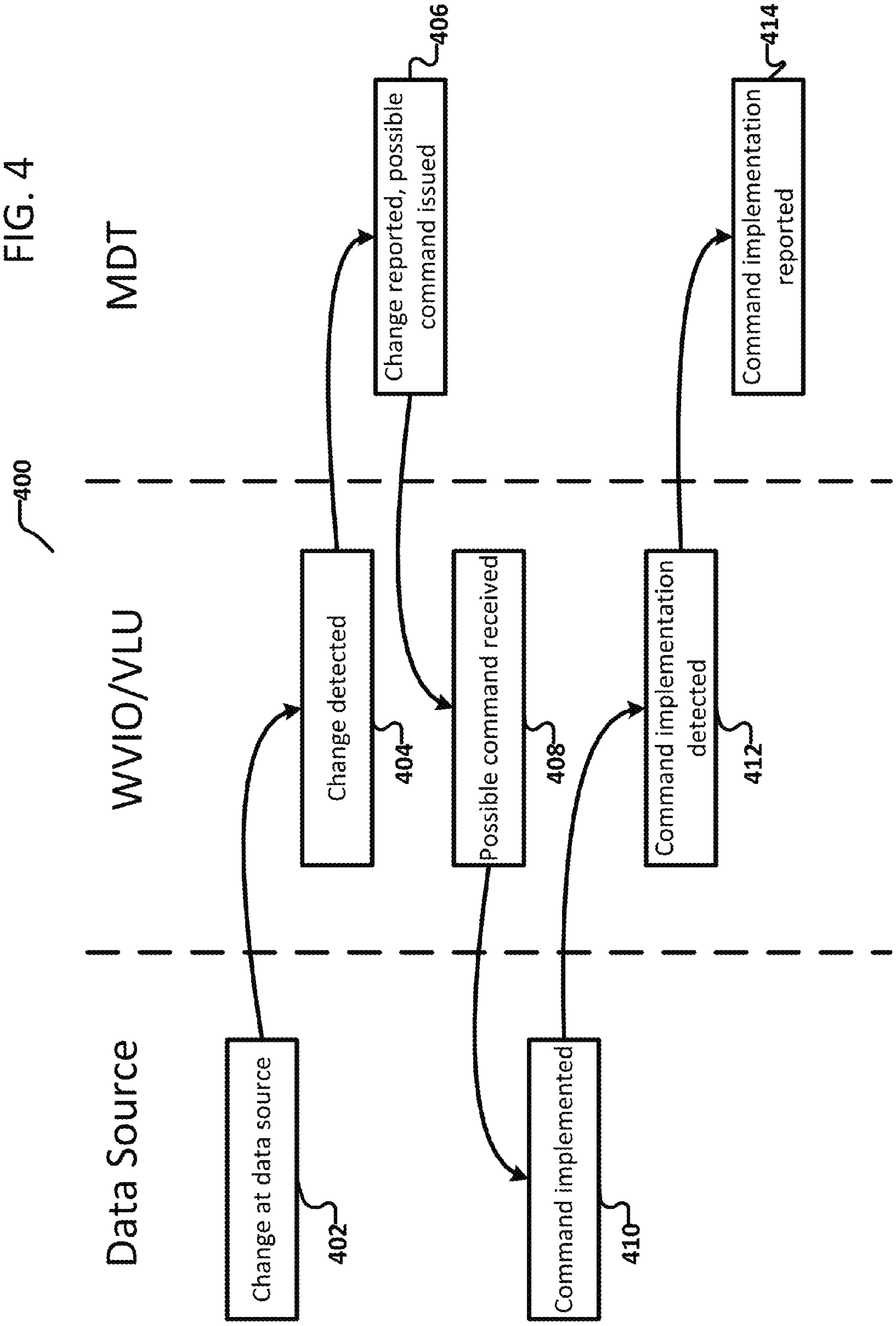
FIG. 4 is a diagram of a flow of communication between aspects of a system for transit industry vehicle hardware-agnostic communication according to a non-limiting embodiment of the present invention.

FIG. 4 is a diagram of flows 400 of communication between aspects of a system for transit industry vehicle hardware-agnostic communication. Although 402-414 are shown, a typical communication may include either 402-410 (Scenario 1) or 406-414 (Scenario 2), although others, or longer sequences, are considered within the scope of the present invention.

In Scenario 1 a communication begins with an event at TIV IO 20 and ends with TIV IO 20 being sent a communication TIV IO 20 receiving the communication may either be the same one or another one.

In Scenario 2 a communication begins with an action at MDT 22 and ends with a response back to MDT 22. The response back may be received by the same MDT 22.

In a first example a covert alarm TIV IO 20 changes states at 402. At 404 VLU 14 detects the change of state and reports the change of state to MDT 22 and MDT-A 210 via REST-H 202 on VLU 14 communicating with REST-C 208.

At 406 MDT-A 210 issues a command to set the video camera discrete output to "On" to VLU 14 via the REST interface.

At 408 VLU 14 receives the command to set the video camera discrete output to "On"" via REST-H 202 Interface from the MDT-A 210.

At 410 VLU 14 sets the video camera discrete output to an "On" state, enabling the camera. The camera signal can then be viewed to determine what action should be taken (for example an action by a driver of the bus having the alarm condition).

In a second example, a passenger counter system is being used. At 402 a door open event occurs (detected by either a discrete input or J1708 message). At 404 VLU-A detects the change of door open state and issues a command, via the J1708 port, to the passenger counter device that the door is open, which triggers the passenger counter to start counting the number of passengers boarding (getting on the vehicle or bus) and alighting (getting off the vehicle or bus). Still at 404, VLU-A detects the change of door open state and reports the current state to MDT-A via the REST interface.

At 406, MDT-A executes, based on the current configuration, a variety of pre-defined tasks related to the door open event.

At 408 VLU-A waits for the door close state to occur. At 410 the door close state is detected (by either a Discrete Input or J1708 Message).

At 412 VLU-A detects the change of door close state and issues a command, via the J1708 port, to the passenger counter device that the door is closed, which triggers the passenger counter to stop counting passengers. Finally, VLU-A reports the current state to MDT-A via the REST Interface.

Figure 5:
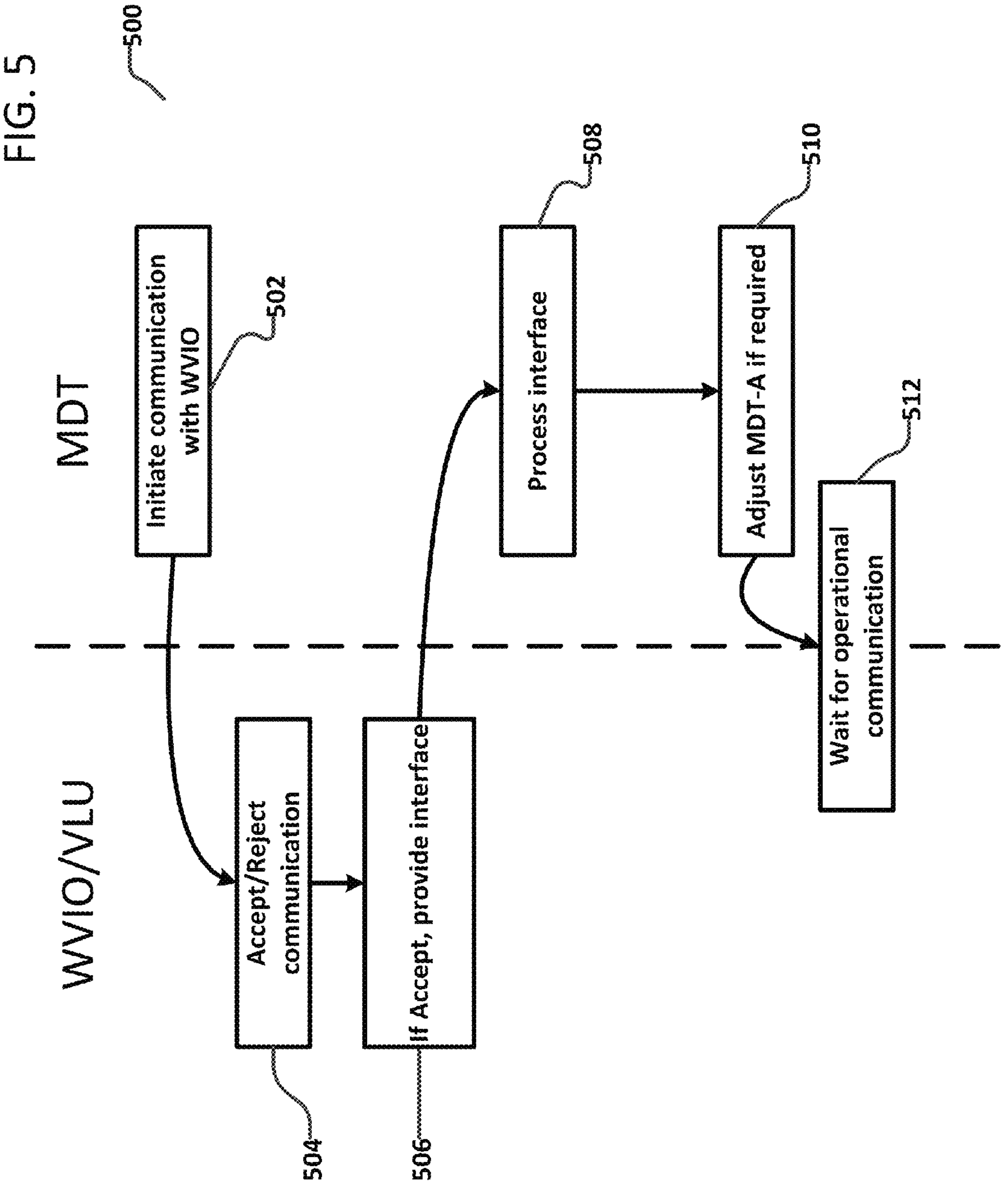
FIG. 5 is a diagram of a method for establishing communication between a VLU and an MDT according to a non-limiting embodiment of the present invention.

FIG. 5 is a diagram of a method 500 for establishing communication between VLU 14 and MDT 22.

Method 500 begins at 502 where MDT 22 initiates communication with VLU 14. This initiation may be accomplished in many ways, some of which may be akin to selecting WiFi networks for example. Of course, it is to be understood that VLU 14 may actually "initiate" the communication, for example by broadcasting itself to MDT 22 (and a particular MDT 22 being able to receive or understand the broadcast based on one or more criteria of MDT 22 or VLU 14. Initiating the communication may include requesting, by MDT 22 (or a processor thereon), access to VLU 14.

At 504, VLU 14 determines whether to accept or reject communication. This may be determined, for example, by knowing what MDT 22 is making the request (such as by an MDT 22 identifier being provided, and VLU 14 determining whether it is valid), by receiving a user name and password from MDT 22, or other approaches as would be known to those of skill in the art.

Of course, it is to be understood that different MDTs 22 may have different access levels. For example, some may be able to read and write TIV IO 20 values. Others may only be able to read such values. Such abilities may relate to the user of MDT 22, for example, where a rider of TIV 12 may be allowed to read simple values (such as a GPS location), while operators of TIV 12, transit supervisors, or emergency crews may have different abilities. Other different access levels, or motivations therefore, are within the scope of the present invention.

If communication is rejected at 504 then method 500 may end.

If communication is accepted at 504 then method 500 continues at 506 where an interface may be provided to MDT 22 by VLU 14. This may substantially comprise, for example, VLU 14 providing REST IM 214 to MDT 22.

At 508 MDT 22 receives the interface and processes the interface. Processing may involve reading the interface to determine characteristics and information about VLU 14. For example, processing may include determining TIV IO 20 associated with VLU 14, determining attributes of TIV 12, and obtaining other features of VLU 14.

Processing may also involve "setting up" MDT 22 to an initial state—such as a state that an operator may desire to be in prior to starting a run in TIV 12. This may involve reading certain values from TIV IO 20 so that MDT 22 can present an initial state to a user of MDT 22. This may further involve adding or removing user interface elements for monitoring or controlling the TIV IO 20 that are possible given the combination of the particular TIV 12 and user of MDT 22. User interface elements (not shown) may include text boxes, toggles, slides or bars, or other features as are known in the art to view and set parameters of software applications.

Determining such features and characteristics, or other processing at 508, may result in configuration changes to MDT 22 (and in particular MDT-A 210) at 510. For example, if TIV 12 does not have a passenger counter system, then MDT-A 210 may disable or remove the feature that would allow a user of MDT-A 210 to query for the passenger count. Of course other adjustments to MDT-A 210 may occur, for example to match the route, driver, date, and other aspects of the present circumstance in which the particular MDT 22 is communicating with the particular VLU 14.

Method 500 proceeds to 512 where both MDT 22 and VLU 14 may wait for operational communication, as such operational communication is described herein.

It will be apparent to one of skill in the art that other configurations, hardware etc may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

What is claimed is:

1. A method for hardware-agnostic communication between one or more mobile data terminals (MDT) used for monitoring and controlling one or more TIV inputs or outputs (TIVIO) of transit industry vehicles, and one or more vehicle logic units (VLU) located on transit industry vehicles (TIV), that are capable of communicating with one or more TIVIO, comprising:

requesting, by an MDT application executed by a processor on a first MDT, communication with a first VLU on a first TIV;

accepting, by a VLU application executed by a processor on the first VLU, the request to communicate from the first MDT;

providing, by the VLU application executed by a processor on the first VLU, a first abstraction interface to the first MDT;

processing, by the MDT application executed by a processor on the first MDT, the provided abstraction interface wherein the processing further comprises:

receiving the XML file;

determining the first VLU's components;

and adjusting an application on the first MDT, responsive to the results of determining, wherein the adjusting further comprises:

adding, to a monitoring screen of the application, a user interface element displaying values read from TIVIO, for each one or more TIVIO that can be monitored by the first MDT;

inserting, on a controlling screen of the application, a user interface element presenting values read from TIVIO and used for setting values of TIVIO, for each one or more TIVIO that can be controlled by the first MDT; and monitoring or controlling, by the MDT application executed by a processor on the first MDT, the first TIV; and wherein the accepting further comprises granting an access level to the first MDT and a second MDT and wherein the one or more components that can be monitored and the one or more components that can be controlled are based on the access level granted and wherein the requesting, processing and monitoring are done concurrently by a first MDT and the second MDT communicating with a first VLU, and the accepting and providing are done by the first VLU and wherein the one or more components can be monitored, and the one or more components can be controlled, based on the access level granted and wherein the first MDT is granted a rider access level and wherein the adjusting further comprises allowing the MDT application executed by a processor on the first MDT to read a global positioning system location of the first TIV and the second MDT is granted an operator access level and wherein the adjusting further comprises allowing the MDT application executed by a processor on the second MDT to read and write TIVIO values.

2. The method of claim 1 wherein the abstraction interface comprises an XML file having one or more components, each component representative of one of one or more TIVIO of the first TIV.

3. The method of claim 2 wherein the providing further comprises:

polling the TIV for TIVIO on the TIV;

inserting a component into the XML, file for each TIVIO on the TIV; and obtaining one or more TIVIO values for each component having at least one value.

4. The method of claim 1 wherein the requesting, processing and monitoring are done by a first MDT communicating with a first VLU and a second VLU, and the accepting and providing are both done by the first VLU and the second VLU.

5. The method of claim 1 wherein the adjusting further comprises disabling the MDT application executed by a processor on a first MDT from querying for a passenger count for the first TIV.

6. The method of claim 1 wherein the providing comprises providing, by the VLU application executed by a processor on the first VLU, a first abstraction interface to the first MDT based on the access level granted to the first MDT and a second abstraction interface to the second MDT based on the access level granted to the second MDT and wherein the first abstraction interface is different from the second abstraction interface.

* * * * *